May 4, 1948. G. E. DATH 2,440,714
FRICTION SHOCK ABSORBING MECHANISM FOR RAILWAY DRAFT RIGGINGS
Filed Aug. 13, 1945
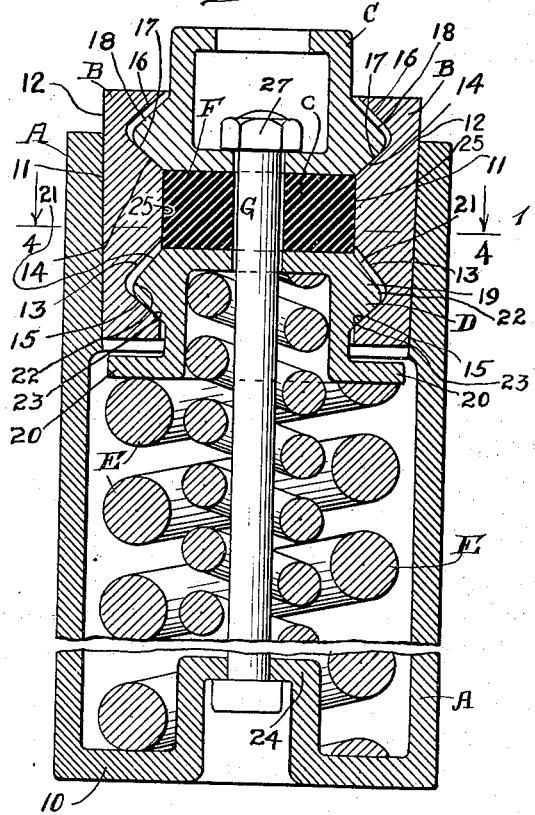
Fig. 1
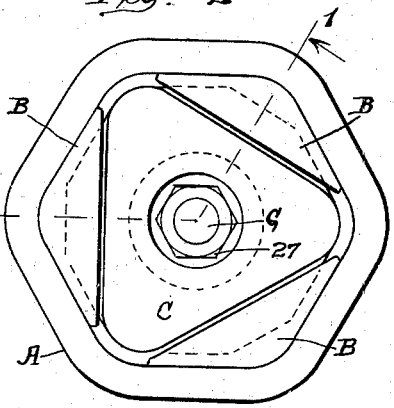
Fig. 2
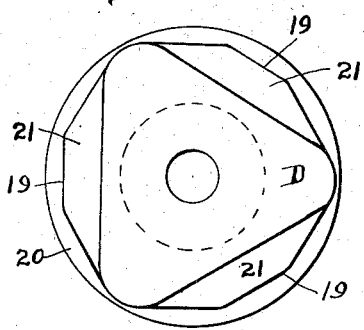
Fig. 3
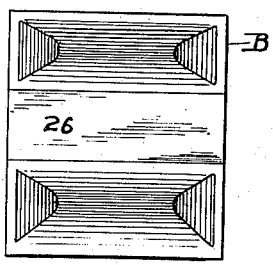
Fig. 5
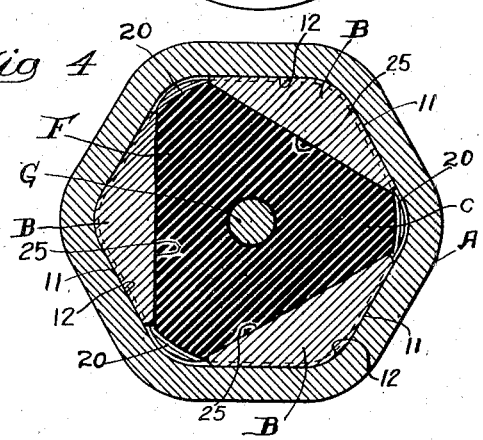
Fig 4
Fig. 6
Inventor:
George E. Dath.
By Henry Fuchs.
Atty.

Patented May 4, 1948

2,440,714

UNITED STATES PATENT OFFICE 2,440,714

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application August 13, 1945, Serial No. 610,587

6 Claims. (Cl. 213—24)

This invention relates to improvements in friction shock absorbing mechanisms for railway draft riggings.

One object of the invention is to provide a friction shock absorbing mechanism particularly adapted for use in railway draft riggings, having relatively light action to absorb the lighter shocks to which the mechanism is subjected in service, followed by greater resistance to absorb the heavier shocks.

A further object of the invention is to provide a friction shock absorbing mechanism of the character indicated comprising a tapered friction casing; friction shoes having sliding frictional engagement with the casing; a blunt angled wedge receiving the actuating force and having wedging engagement with the shoes; a combined wedge and spring follower having keen wedging engagement with the shoes; a main spring resistance yieldingly opposing inward movement of the combined wedge and spring follower; and yielding means interposed between the wedge and combined wedge and spring follower, wherein the yielding means initially transmits the force from the wedge to the combined wedge and spring follower and temporarily holds the same out of wedging engagement with the shoes, and is of lesser capacity than the main spring resistance, whereby it is compressed and shortened to such an extent after a predetermined compression of the mechanism as to render effective the wedging action of the combined wedge and spring follower during the remainder of the compression stroke, thereby producing high frictional resistance through the keen wedging engagement between the shoes and said combined wedge and spring follower.

Other objects of the invention will more clearly appear from the description and claims hereinafter following.

In the drawing forming a part of this specification, Figure 1 is a vertical sectional view of my improved friction shock absorbing mechanism, taken on two intersecting planes at 120° to each other, and corresponding substantially to the line 1—1 of Figure 2. Figure 2 is a top plan view of Figure 1. Figure 3 is a top plan view of the combined wedge and spring follower of my improved mechanism. Figure 4 is a horizontal, transverse sectional view, corresponding substantially to the line 4—4 of Figure 1. Figure 5 is a top plan view of one of the friction shoes of my improved mechanism. Figure 6 is a side elevational view of the shoe shown in Figure 5, looking upwardly in said figure.

My improved friction shock absorbing mechanism, as shown in the drawing, comprises broadly a friction casing A; three friction shoes B—B—B; an outer wedge block C in wedging engagement with the shoes; a combined wedge and spring follower D having wedge faces engageable with the shoes; a main spring resistance E; a yielding pressure transmitting member F interposed between the outer wedge block and the combined wedge and spring follower D; and a retainer bolt G.

The casing A is in the form of a hollow, tubular member of hexagonal transverse cross section, open at one end and closed at the other end by a transverse wall 10. At the open end, the casing A is provided with three longitudinally extending, interior friction surfaces 11—11—11 of V-shaped transverse cross section, each V-shaped surface being formed by two adjacent walls of the hexagonal casing. The three friction surfaces 11—11—11 converge inwardly of the open end of the casing, the casing thus being of interiorly tapered formation at the open end.

The friction shoes B, which are three in number, are telescoped within the open end of the casing A. These three shoes are of similar design. Each shoe B has a longitudinally extending friction surface 12 on the outer side thereof, which is of V-shaped transverse section and engages with one of the V-shaped friction surfaces 11 of the casing.

Each shoe has inner and outer wedge faces 13 and 14 on the inner side thereof. The wedge face 13 faces inwardly or rearwardly and is disposed at a relatively keen wedging angle with respect to the longitudinal central axis of the mechanism, while the wedge face 14 faces outwardly or forwardly and is disposed at a relatively blunter wedging angle with respect to said axis. Inwardly or rearwardly of the wedge face 13, each shoe has an outwardly or forwardly inclined abutment face 15 which is opposed to the face 13 and, together with said last named face, defines a transversely extending groove of V-shaped transverse section. Outwardly or forwardly of the wedge 14, each shoe has an inwardly or rearwardly inclined face 16 which is opposed to the face 14 and, together with said last named face, defines a second transversely extending groove of V-shaped transverse section.

The wedge C is in the form of a hollow block of substantially triangular outline in plan. The block C has three wedge faces 17—17—17 at the inner or rear end thereof arranged symmetrically about the central longitudinal axis of the mechanism. Each face 17 of the wedge C engages with and is correspondingly inclined to the outer wedge face 14 of one of the shoes B, that is, the face 17 is disposed at a relatively blunt wedging angle with respect to the longitudinal axis of the mechanism. Each face 17 is formed on an outwardly extended, transverse, riblike portion 18 of V-shaped form on the wedge C. As shown in Figure 1, the projection or rib 18 is engaged in the V-shaped groove of the shoe formed by the faces 14 and 16 and is of such dimensions that a substantial clearance is provided between said rib and the face 16.

The combined wedge and spring follower D comprises a wedge section 19 and a follower section 20. The wedge section 19 is in the form of a hollow block of substantially triangular shape and the follower section 20 is in the form of a laterally outstanding, annular flange at the inner end of said block and is formed integral therewith. The blocklike wedge section 19 has three wedge faces 21—21—21 at the outer or forward end thereof, each face 21 being correspondingly inclined to and cooperating with the wedge face 13 of one of the shoes B. In other words, the faces 21—21—21 are all disposed at relatively keen wedging angles with respect to the longitudinal axis of the mechanism. Each face 21 is formed on a transversely extending, V-shaped, lateral projection or rib 22 on the wedge section 19. The inner or rear face 23 of the rib 22 is correspondingly inclined to and normally bears on the abutment face 15 of one of the shoes. As shown in Figure 1, the rib 22 is engaged in the V-shaped groove formed by the faces 13 and 15 of the shoe B and is of such dimensions that a substantial clearance is provided between the wedge faces 21—21—21 of the wedge section 19 and the wedge faces 13—13—13 of the shoes, in the normal full release position of the parts.

The main spring resistance E comprises a relatively heavy, outer coil and a lighter inner coil. The inner coil bears at its rear or lower end on an inwardly extending hollow boss 24 on the wall 10 of the casing A and has its front or upper end seated in the hollow pocket or opening of the combined wedge and spring follower D. The outer coil of the spring resistance has its opposite ends bearing on the end wall 10 of the casing and the spring follower section 20 of the combined wedge and spring follower D. In the assembled condition of the mechanism, the spring resistance E is preferably under very slight initial compression.

The yielding pressure transmitting member F is preferably in the form of a rubber block of triangular shape. The block F is interposed between the wedge block C and the combined wedge and spring follower D and is surrounded by the three shoes B—B—B. The rubber block F acts in the manner of a spring in transmitting the pressure from the wedge block C to the combined wedge and spring follower D, and has flat, transverse, outer and inner end faces bearing directly on the flat inner end face of the wedge block C and the flat outer end face of the combined wedge and spring follower D. The three flat side faces of the rubber block, which faces are indicated by 25—25—25, bear on the inner sides of the three shoes B—B—B, each shoe having a flat face 26 on the inner side thereof for this purpose, which is located between the outer and inner wedge faces 14 and 13 of said shoe.

The rubber block F has considerably less shock absorbing capacity than the main spring resistance E and thus the compression of the rubber block is more rapid than the compression of the spring resistance E during the compression stroke of the mechanism. The rubber block is of such thickness that, in the normal full release position of the mechanism as shown in Figure 1, the combined wedge and spring follower D is held clear of the wedge faces 13—13—13 of the shoes and has the abutment faces 23—23—23 thereof bearing on the abutment faces 15—15—15 of the three shoes B—B—B. Thus, the wedge faces 21 of the combined wedge and spring follower remain inactive until the rubber block has been compressed to a sufficient extent to permit engagement between the wedge faces 21—21—21 and 13—13—13. Inasmuch as compression of the rubber block tends to expand the same laterally or radially, the same will act to forcibly press the friction shoes against the friction surfaces of the casing.

The mechanism is held assembled by the retainer bolt G, which extends through the inner coil of the spring resistance E and through aligned openings in the combined wedge and spring follower D, the rubber block F, and the wedge block C. The bolt G has the head thereof at the lower end, the same being seated in the hollow boss 24 of the casing and anchored thereto. At the forward or upper end, the bolt is provided with the usual nut 27, which is arranged within the hollow portion of the wedge block C and has shouldered engagement with the rear or inner end wall of said hollow block to anchor the same to the bolt.

The operation of my improved friction shock absorbing mechanism is as follows: Upon compression of the mechanism, the wedge block C is forced inwardly of the casing A, wedging the shoes B—B—B apart and forcing the same to slide inwardly or rearwardly on the friction surfaces of the casing. During this action the rubber block F is compressed between the wedge block C and the combined wedge and spring follower D, causing the rubber block to expand laterally or radially and press the friction shoes against the friction surfaces of the casing. The main spring resistance E is also compressed during this action, due to the inward movement of the combined wedge and spring follower D. The frictional resistance provided during this initial or preliminary action is relatively light, due to the blunt angled wedging engagement between the wedge block C and the shoes B—B—B. Inasmuch as the rubber block F is of much lighter capacity than the spring resistance E, compression of the former progresses more rapidly than that of the latter, and, as the compression of the mechanism continues, the clearance between the wedge faces 13—13—13 of the shoes and the wedge faces 21—21—21 of the combined wedge and spring follower D is taken up and the wedge faces 13 and 21 become active to force the shoes against the friction surfaces of the casing. Due to the relatively keen wedging angle of the cooperating faces 13 and 21, the shoes are more firmly pressed against the friction surfaces of the casing with resultant higher frictional resistance and greater shock absorbing capacity during the remainder of the compression stroke of the mechanism.

Upon removal of the actuating force, the parts of the mechanism are all returned to the normal full release position shown in Figure 1 by the expansive action of the spring resistance E and the action of the rubber block F in returning to its original shape, outward movement of the wedge block C being arrested by the retainer bolt G.

I claim:

1. In a friction shock absorbing mechanism, the combination with a friction casing having interior friction surfaces; of a plurality of friction shoes slidingly telescoped within the casing and engaging the friction surfaces thereof; an outer wedge block having wedging engagement with the outer ends of the shoes; a spring follower within the casing having a wedge projection rigid therewith and having active wedging engagement with the inner ends of the shoes after a predetermined compression of the mechanism; a main spring resistance within the casing yieldingly opposing inward movement of the spring follower; and a yielding pressure transmitting member interposed between and bearing at opposite ends directly on said wedge block and spring follower and transmitting the actuating force from one to the other, said pressure transmitting member holding said wedge projection of the spring follower normally out of engagement with the shoes, said member being of lesser shock absorbing capacity than said main spring resistance and being compressed to a degree, upon compression of the mechanism to said predetermined extent, to effect engagement of said wedge projection with the shoes.

2. In a friction shock absorbing mechanism, the combination with a friction casing having interior friction surfaces; of a plurality of friction shoes slidingly telescoped within the casing in frictional contact with said friction surfaces; an outer central wedge block in wedging engagement with the outer ends of the shoes; a yielding rubber block embraced between said shoes and bearing on the inner end of said wedge block; a spring follower within the casing bearing on said rubber block and receiving the actuating force therefrom during a predetermined portion of the compression stroke of the mechanism, said spring follower and shoes having cooperating wedge faces; and a main spring resistance within the casing, said main spring resistance being of greater shock absorbing capacity than said rubber block, whereby said rubber block is compressed between said wedge lock and spring follower and forced to expand laterally during said predetermined portion of the compression stroke to force said shoes against the friction surfaces of the casing.

3. In a friction shock absorbing mechanism, the combination with a friction casing having interior friction surfaces; of a plurality of friction shoes slidingly telescoped within the casing and engaging the friction surfaces thereof; an outer wedge block having relatively blunt wedging engagement with the outer ends of the shoes; a spring follower within the casing having a projection rigid therewith and having relatively keen wedging engagement with the inner ends of the shoes; a main spring resistance within the casing yieldingly opposing inward movement of the spring follower; and a yielding pressure transmitting member interposed between and bearing at opposite ends on the wedge block and spring follower and transmitting the force from one to the other, said yielding pressure transmitting member being of lesser shock absorbing capacity than said main spring resistance.

4. In a friction shock absorbing mechanism, the combination with a friction casing having interior friction surfaces; of a plurality of friction shoes slidingly telescoped within the casing and engaging the friction surfaces thereof; an outer wedge block having relatively blunt wedging engagement with the outer ends of the shoes; a spring follower within the casing having a wedge projection in relatively keen wedging engagement with the inner ends of the shoes after a predetermined compression of the mechanism; a main spring resistance within the casing yieldingly opposing inward movement of the spring follower; and a yielding pressure transmitting member interposed between the wedge block and spring follower and transmitting the actuating force from one to the other, said pressure transmitting member holding said wedge projection of the spring follower normally out of engagement with the shoes, said member being of lesser shock absorbing capacity than said main spring resistance and being compressed to a degree, upon compression of the mechanism to said predetermined extent, to effect engagement of said wedge projection with the shoes.

5. In a friction shock absorbing mechanism, the combination with a friction casing having interior friction surfaces; of a plurality of friction shoes slidingly telescoped within the casing in frictional contact with said friction surfaces; an outer central wedge block in relatively blunt wedging engagement with the outer ends of the shoes; a yielding rubber block embraced between said shoes and bearing on the inner end of said wedge block; a spring follower within the casing bearing on said rubber block and receiving the actuating force therefrom during a predetermined portion of the compression stroke of the mechanism, said spring follower and shoes having cooperating wedge faces disposed at a relatively keen wedging angle with respect to the longitudinal central axis of the mechanism; and a main spring resistance within the casing, said main spring resistance being of greater shock absorbing capacity than said rubber block, whereby said rubber block is compressed between said wedge block and spring follower and forced to expand laterally during said predetermined portion of the compression stroke to force said shoes against the friction surfaces of the casing.

6. In a friction shock absorbing mechanism, the combination with a friction casing having interior friction surfaces; of a plurality of friction shoes telescoped within the casing in sliding frictional contact with said friction surfaces; an outer central wedge block; interengaging wedge faces on said block and shoes disposed at a relatively blunt wedging angle with respect to the longitudinal central axis of the mechanism; a rubber block embraced between said shoes and bearing on the inner end of said wedge block; a spring follower within the casing, said spring follower and shoes having cooperating wedge faces disposed at a relatively keen wedging angle with respect to said longitudinal central axis of the mechanism, said rubber block normally forcing the spring follower inwardly with respect to said shoes to provide clearance between the wedge faces of the shoes and said spring follower during a predetermined part of the compression stroke of the mechanism; and a main spring resistance within the casing yieldingly opposing inward movement of the spring follower, said main spring resistance being of greater shock absorbing capacity than said rubber block, whereby said rubber block is compressed between the wedge block and spring follower to an extent, during said predetermined portion of the compression stroke, to bring said keen wedge faces in active engagement during the remainder of the compression stroke of the mechanism.

GEORGE E. DATH.

REFERENCES CITED

The following references are of record in the file of this patent:

UNITED STATES PATENTS

| Number | Name | Date |
|---|---|---|
| 1,403,617 | Moore | Jan. 17, 1922 |
| 1,663,994 | O'Connor | Mar. 27, 1928 |
| 2,382,563 | Haxeltine | Aug. 14, 1945 |